United States Patent
Lee et al.

(10) Patent No.: US 11,507,384 B2
(45) Date of Patent: Nov. 22, 2022

(54) ELECTRONIC DEVICE FOR PERFORMING BOOTING, AND OPERATING METHOD THEREFOR

(71) Applicant: Samsung Electronics Co., Ltd., Suwon-si (KR)

(72) Inventors: Wongun Lee, Suwon-si (KR); Chul Kang, Suwon-si (KR); Hakryoul Kim, Suwon-si (KR); Youngjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 16/978,650

(22) PCT Filed: Mar. 6, 2019

(86) PCT No.: PCT/KR2019/002622
§ 371 (c)(1),
(2) Date: Sep. 4, 2020

(87) PCT Pub. No.: WO2019/172659
PCT Pub. Date: Sep. 12, 2019

(65) Prior Publication Data
US 2021/0004240 A1 Jan. 7, 2021

(30) Foreign Application Priority Data
Mar. 6, 2018 (KR) .......................... 10-2018-0026367

(51) Int. Cl.
*G06F 9/4401* (2018.01)
*G06F 3/06* (2006.01)
(Continued)

(52) U.S. Cl.
CPC ............ *G06F 9/4401* (2013.01); *G06F 3/067* (2013.01); *G06F 9/50* (2013.01); *H04L 67/1097* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 6,684,229 B1 * | 1/2004 | Luong | G06F 11/1469 |
| | | | 707/999.102 |
| 2013/0111202 A1 | 5/2013 | Zeng | |
| 2014/0066040 A1 | 3/2014 | Zeng | |

FOREIGN PATENT DOCUMENTS

| | | |
|---|---|---|
| JP | H05-143350 A | 6/1993 |
| JP | H06-180665 A | 6/1994 |

(Continued)

OTHER PUBLICATIONS

International Search Report dated Jun. 10, 2019 in connection with International Patent Application No. PCT/KR2019/002622, 2 pages.
(Continued)

*Primary Examiner* — Fahmida Rahman

(57) ABSTRACT

An electronic device according to various embodiments of the present invention comprises a display, a memory, and a processor operatively connected to the display and the memory, wherein the processor may be configured to: display, on the display, the state of a storage resource of a first partition included in the memory, in a state in which first booting has been completed; in response to a first command for acquiring the storage resource of the first partition, perform second booting of the electronic device, different from the first booting; delete designated data from data stored in the storage resource of the first partition so as to acquire the storage resource during the performing of the second booting; and complete the second booting of the
(Continued)

electronic device after the acquisition of the storage resource.

20 Claims, 11 Drawing Sheets

(51) Int. Cl.
*G06F 9/50* (2006.01)
*H04L 67/1097* (2022.01)

(56) References Cited

FOREIGN PATENT DOCUMENTS

| | | |
|---|---|---|
| JP | H06-231036 A | 8/1994 |
| JP | 2004-362221 A | 12/2004 |
| KR | 10-2007-0008997 A | 1/2007 |

OTHER PUBLICATIONS

Written Opinion of the International Searching Authority dated Jun. 10, 2019 in connection with International Patent Application No. PCT/KR2019/002622, 4 pages.

* cited by examiner

ELECTRONIC DEVICE FOR PERFORMING BOOTING, AND OPERATING METHOD THEREFOR

CROSS-REFERENCE TO RELATED APPLICATIONS

This application is a 371 of PCT International Application No. PCT/KR2019/002622 filed on Mar. 6, 2019, which claims priority to Korean Patent Application No. 10-2018-0026367 filed on Mar. 6, 2018 in the Korean Intellectual Property Office, the disclosures of which are herein incorporated by reference in their entirety.

BACKGROUND

1. Field

Various embodiments of the present disclosure relate to an electronic device for performing booting and an operating method of the electronic device.

2. Description of the Related Art

With the development of wireless communication technologies and integrated device technologies, electronic devices such as smartphones have been widely spread. The electronic device (or a computing device) such as a smartphone may enter a state of being available to a user by performing booting.

The electronic device such as a smartphone may store data in a storage device (e.g., a memory). In this case, a space for storing data may include a user data region that stores user data. A storage resource of the user data region may include a block space indicating a space for actually storing data and information related to a file node indicating the number of data or files that may be generated.

SUMMARY

An electronic device may determine that a storage resource is not sufficient when at least one of a block space or a file node is insufficient. When the storage resource is insufficient, the electronic device may not operate normally. When the storage resource is insufficient, the electronic device may not be able to perform booting normally. When the electronic device is not capable of performing booting, the electronic device may not be able to enter a state of being available to the user.

When the electronic device may not be able to perform booting, the electronic device may not be able to identify a reason as insufficiency of a storage resource. Moreover, in the related art, to solve a booting error of the electronic device, caused by insufficiency of the storage resource, the electronic device may have to be reset, therefore, when booting is not performed due to insufficiency of the storage resource, the user may lose data stored in the electronic device.

In addition to the above-described booting problem, processes operating in the electronic device may not operate normally.

Various embodiments provide an electronic device and an operating method thereof, in which when booting of the electronic device is not performed, it may be determined that the booting is not performed because of insufficiency of a storage resource.

Various embodiments provide an electronic device and an operating method thereof, in which when booting of the electronic device is not performed normally due to a capacity of a storage resource, the storage resource may be temporarily obtained to perform booting.

An electronic device according to various embodiments of the present disclosure includes a display, a memory, and a processor operatively connected with the display and the memory, in which the processor is configured to display, on the display, a state of a storage resource of a first partition included in the memory, in a state where first booting is completed, in response to a first command for obtaining the storage resource of the first partition, perform second booting, which is different from the first booting, on the electronic device, obtain the storage resource by deleting designated data from data stored in the storage resource of the first partition during the peforming of the second booting, and complete the second booting of the electronic device after obtaining the storage resource of the first partition.

An operating method of an electronic device according to various embodiments of the present disclosure includes displaying a state of a storage resource of a first partition included in a memory of the electronic device, in a state where first booting is completed, in response to a first command for obtaining the storage resource of the first partition, performing second booting, which is different from the first booting, on the electronic device, obtaining the storage resource by deleting designated data from data stored in the storage resource of the first partition, during the performing of the second booting, and completing the second booting of the electronic device after obtaining the storage resource of the first partition.

A computer-readable recording medium according to various embodiments of the present disclosure stores programs for executing operations including displaying a state of a storage resource of a first partition included in a memory of the electronic device, in a state where first booting is completed, performing second booting, which is different from the first booting, on the electronic device in response to a first command for obtaining the storage resource of the first partition, obtaining the storage resource by deleting designated data from data stored in the storage resource of the first partition, during the performing of the second booting, and completing the second booting of the electronic device after obtaining the storage resource of the first partition.

An electronic device according to various embodiments may determine that a booting operation is not performed because of insufficiency of a storage resource, when the booting operation is not performed.

An electronic device according to various embodiments may perform a normal booting operation by temporarily securing a storage resource even when a booting operation of the electronic device is not performed normally due to insufficiency of the storage resource.

BRIEF DESCRIPTION OF THE DRAWINGS

A detailed description of each drawing will be provided to sufficiently understand drawings referred to in a detailed description of the present disclosure.

DETAILED DESCRIPTION

Figure 1:
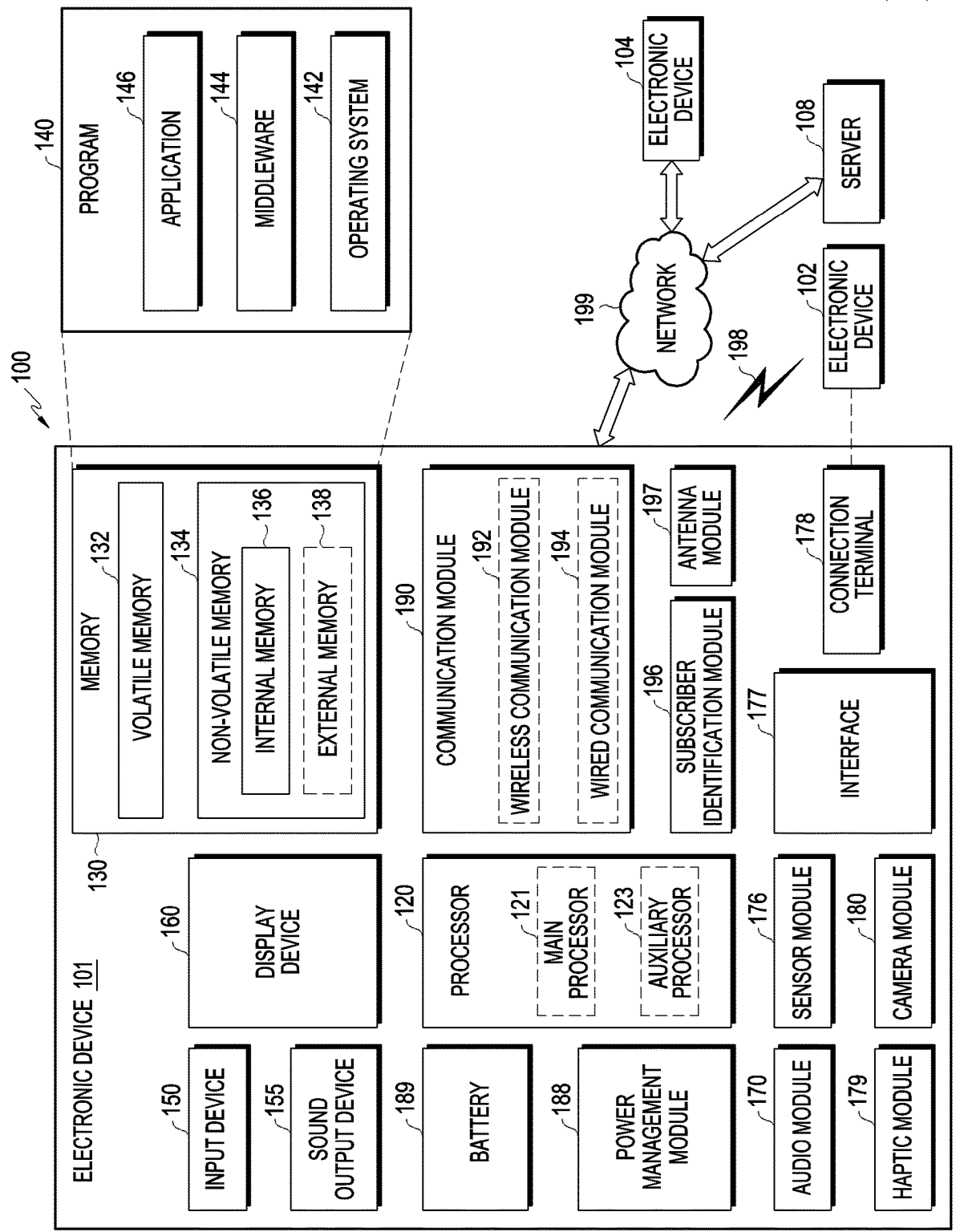
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
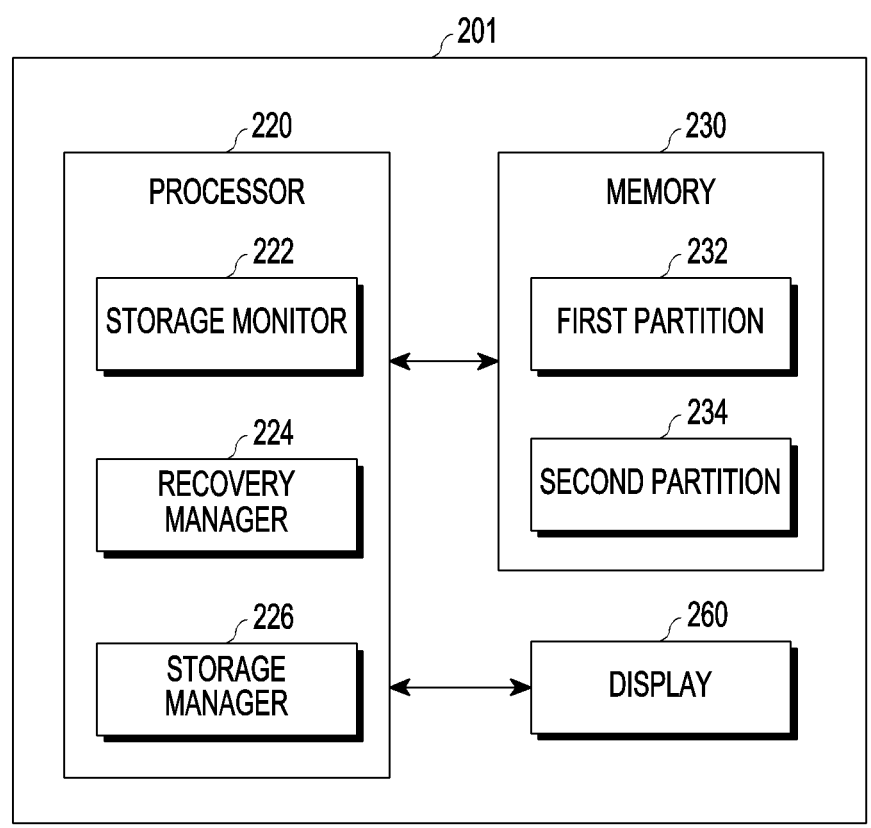
FIG. 2 is a schematic diagram of an electronic device according to various embodiments.

FIG. 2 is a block diagram of an electronic device 201 according to various embodiments of the present disclosure.

Referring to FIG. 2, the electronic device 201 may be implemented substantially identically or similarly to the electronic device 101 described with reference to FIG. 1. For example, the electronic device 201 may be implemented with a terminal or a smartphone capable of performing a communication function.

According to various embodiments, the electronic device 201 may include a processor 220, a memory 230, and a display 260.

According to various embodiments, the processor 220 may control the overall operation of the electronic device 201. For example, the processor 320 may be implemented substantially identically or similarly to the processor 120 of FIG. 1.

According to various embodiments, the processor 220 may perform booting (or a booting operation) of the electronic device 201. For example, the processor 220 may perform first booting and/or second booting for performing various functions.

According to various embodiments, the processor 220 may perform normal booting or recovery booting. For example, normal booting may mean booting of the electronic device 201 to a state for a user to generally use the electronic device 201. Normal booting may include a normal mode for booting to a state where a default application is executed and a safe mode for booting to a state where the default application is not executed, to exclude an abnormal operation of applications installed in the electronic device 201 and to a state where the electronic device 201 is available. For example, recovery booting, which is separate from normal booting, may mean booting for recovering the electronic device 201. Alternatively, recovery booting may mean booting for updating core software that is crucial to an operation of the electronic device 201. Recovery booting may modify an image (e.g., a boot image, a code, etc.) used in normal booting or delete all user data stored in the electronic device 201 to boot the electronic device 201 to a state of being resettable (e.g., factory-reset).

Herein, booting completion or a booting completion state may mean a state where booting is performed and booting is normally completed. Meanwhile, herein, normal booting and recovery booting are merely intended for convenience of a description, and technical characteristics of the present disclosure are not limited by the terms, normal booting and recovery booting.

According to various embodiments, the processor 220 may monitor a storage resource of a first partition 232 included in the memory 230, upon completion of normal booting (or in a normal booting mode). For example, the processor 220 may periodically monitor a state of the storage resource of the memory 230. The processor 220 may store information about the monitored state of the storage resource in the memory 230. For example, the storage resource of the first partition 232 may include the size of a remaining space (or the size of a space capable of storage) and/or the number of available file nodes of the first partition 232. The processor 220 may monitor at least one state of the size of the remaining space (or the size of a space capable of storage) and/or the number of available file nodes of the first partition 232.

According to various embodiments, the processor 220 may store the information about the monitored state of the storage resource in the memory 232. In this case, the processor 220 may store the information about the state of the storage resource in a second partition 234 that is different from the first partition 232.

According to various embodiments, the processor 220 may identify the storage resource of the first partition 232 based on the information about the storage resource of the first partition 232 stored in the second partition 234 in a state (or a recovery booting mode) where recovery booting is completed. For example, the processor 220 may directly identify the state of the storage resource of the first partition 232 included in the memory 230 or access the file system and may fail to modify data stored in the first partition 232. The processor 220 may merely delete the entire first partition 232 of the memory 230. Thus, the processor 220 may identify the state of the storage resource of the first partition 232 based on the information about the storage resource of the first partition 232 stored in the second partition 234. The processor 220 may display the information indicating the state of the storage resource of the first partition 232 through the display 260.

According to various embodiments, the processor 220 may perform urgent booting (or emergency booting (EB)) to additionally obtain the storage resource of the first partition 220. For example, the processor 220 may start rebooting of the electronic device 201 upon receipt of a command for performing urgent booting, in a state where recovery booting is completed. The processor 220 may perform normal booting instead of recovery booting. Upon start of normal booting, the processor 220 may delete designated data (or a designated file) from designated data (or designated files) stored in the storage resource of the first partition 232 to additionally obtain (or secure) the storage resource of the first partition 232. The processor 220 may obtain the storage resource of the first partition 232 to enter a state where the electronic device 201 may complete booting (or normal booting). The processor 220 may complete normal booting by additionally obtaining (or securing) the storage resource of the first partition 232.

According to various embodiments, upon completion of normal booting, the processor 220 may guide backup and initialization of data stored in the electronic device 201. For example, the processor 220 may display a message window guiding backup and initialization of data through the display 260.

According to various embodiments, the processor 220 may delete an application (e.g., an application excessively occupying the storage resource of the first partition 232) not operating normally or display a message window guiding deletion through the display 260.

According to various embodiments, the processor 220 may include a storage monitor 222, a recovery manager 224, and a storage manager 226. For example, the storage monitor 222, the recovery manager 224, and the storage manager 226 may be included in the program 140 of FIG. 1 and may be executed by the processor 220.

According to various embodiments, the storage monitor 222 may monitor the state of the storage resource of the first partition 232 (e.g., a user data partition) in a state where normal booting is completed. For example, the storage monitor 222 may monitor a state of at least one of a size of a remaining space and/or the number of available file nodes of the first partition 232, periodically (e.g., at intervals of 1 minute or 30 seconds).

According to various embodiments, the storage monitor 222 may store the periodically stored state of the storage resource of the first partition 232 in the second partition 234 that is different from the first partition 232. The first partition 232 may be a space storing user data, and the second partition 234 may be a storage space accessible in a state where recovery booting is completed, in a state where normal booting is completed, and in a state where normal booting is currently executed.

According to various embodiments, the recovery manager 224 may provide information about the storage resource of the first partition 232 (e.g., a user data partition) in the state where recovery booting is completed. For example, the recovery manager 224 may obtain monitoring data (e.g., data regarding the storage resource of the first partition 232) stored in the second partition 234, and provide information about the size of a remaining space and/or the number of available file nodes of the first partition 232 by using the obtained monitoring data. The recovery manager 224 may provide an alert notification when determining that the storage resource is insufficient (e.g., the currently used resource exceeds a preset value).

According to various embodiments, the recovery manager 224 may trigger urgent booting of the electronic device 201. For example, urgent booting may mean a booting operation for temporarily releasing a state where normal booting may not be performed due to insufficiency of the storage resource of the first partition 232 and performing normal booting.

According to various embodiments, the recovery manager 224 may control the processor 220 to start rebooting for performing normal booting, upon triggering of urgent booting. The recovery manager 224 may generate a certain file or use a system property to notify that urgent booting is to be performed during execution of normal booting.

According to various embodiments, the storage manager 226 may mount the first partition 232 (e.g., a user data partition) and delete a designated file or designated data from the first partition 232 during execution of urgent booting. The storage manager 226 may delete a designated file or designated data to obtain or secure the capacity of the first partition 232 and perform and complete normal booting. For example, the designated file or designated data may include data or a file of low importance. The designated file or the designated data may be determined automatically by the processor 220 or manually by the user. For example, the designated file or the designated data may include system cache and application cache files, log files, an application reported as a malignant application, and/or a messenger application and a temp file used by the messenger application.

Although FIG. 2 shows that the processor 220 includes the storage monitor 222, the recovery manager 224, and the storage manager 226, this merely distinguishes elements according to functions for convenience of a description and the technical spirit of the present disclosure is not limited thereto.

According to various embodiments, the memory 230 may store data of the electronic device 201. The memory 230 may be implemented substantially identically or similarly to the memory 130 of FIG. 1. For example, the memory 230 may be implemented with a non-volatile memory.

According to various embodiments, the memory 230 may include a plurality of partitions. For example, the memory 230 may include the first partition 232 and the second partition 234. The first partition 232 and the second partition 234 may be distinguished according to a layout based on a physical address of the memory 230. In this way, the first partition 232 and the second partition 234 may operate as logical or virtual partitions.

According to various embodiments, the first partition 232 may be a partition that stores user data. The processor 220 may access the first partition 232 in the state where normal booting is currently executed and/or in the state where normal booting is completed. For example, the processor 220 may fail to access the first partition 232 when there is no separate authentication, in the state where recovery booting is completed.

According to various embodiments, the second partition 234 may be a partition accessible both in the state where normal booting is completed and in the state where recovery booting is completed. For example, the second partition 234 may be a partition that is different from the first partition 232 in a logically or physically different region, and/or a different address region.

According to various embodiments, the display 260 may display data of the electronic device 201. The display 260 may be implemented substantially identically or similarly to the display 160 of FIG. 1. For example, the display 260 may be implemented with a touch screen.

According to various embodiments, the display 260 may display information indicating a state (or a booting execution state) regarding a booting progress of the electronic device 201. The display 260 may display the information indicating the state of the storage resource of the first partition 232.

According to various embodiments, the display 260 (e.g., a touch screen) may receive a user input and transmit a signal corresponding to the received input to the processor 220. For example, the display (e.g., the touch screen) may receive a user input corresponding to the information indicating the state regarding the booting progress of the electronic device 201. The display 260 may receive an input corresponding to the information indicating the state of the storage resource of the first partition 232.

Figure 3:
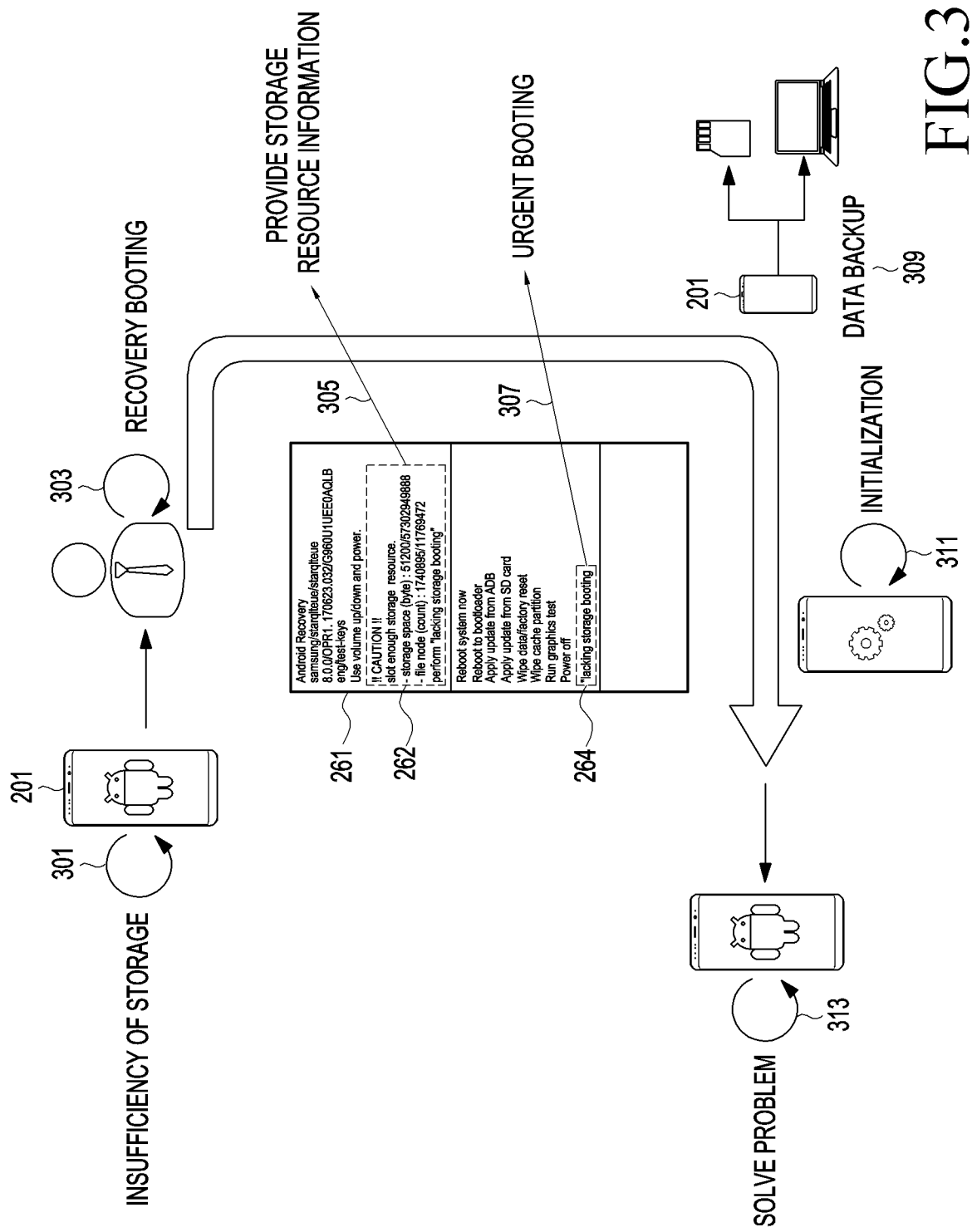
FIG. 3 is a block diagram for describing an operating method of an electronic device according to various embodiments.

FIG. 3 is a block diagram for describing an operating method of the electronic device 201 according to various embodiments.

Referring to FIG. 3, the storage resource of the first partition 232 (e.g., the first partition 232 of FIG. 2) may be insufficient in operation 301. The electronic device 201 may not operate normally due to insufficiency of the storage resource of the first partition 232. For example, the electronic device 201 may fail to perform booting due to insufficiency of the storage resource of the first partition 232 and fail to complete booting. The insufficiency of the storage resource of the first partition 232 may mean a state where the remaining (or available) storage space (or the remaining block size) or the number of remaining (or available) file nodes is not sufficient for a normal operation of the electronic device 201.

According to various embodiments, the electronic device 201 may perform recovery booting to recover a normal-operation state of the electronic device 201 in operation 303. For example, upon receipt of an input for starting recovery booting by a customer service center, the electronic device 201 may start recovery booting. Alternatively, upon receipt of the input for starting recovery booting by a user, the electronic device 201 may start recovery booting and perform recovery booting.

According to various embodiments, the electronic device 201 may display a user interface 261 on the display 260 (e.g., the display 260 of FIG. 2) in the state where recovery booting is completed.

According to various embodiments, the user interface 261 may display information 262 regarding the storage resource of the first partition 232 in operation 305. For example, the information 262 regarding the storage resource may include information about the currently remaining (or available) storage space (or remaining block size) or the number of remaining (or available) file nodes of the first partition 262. Alternatively, the information 262 regarding the storage resource may include a number, a graph, and/or a figure, etc., indicating a ratio of the entire storage resource to the currently remaining resource.

According to various embodiments, the user interface 261 may display an object 264 for performing urgent booting. Upon receipt of an input with respect to the object 264 for performing urgent booting, the electronic device 201 may perform urgent booting in operation 307. For example, upon receipt of a touch input with respect to the object 264 for performing urgent booting through the touch screen 260, the electronic device 201 may perform urgent booting.

According to various embodiments, in response to a command for executing urgent booting (e.g., receipt of the input with respect to the object 264 for performing urgent booting), the electronic device 201 may start normal booting through re-booting. The electronic device 201 may temporarily obtain (or secure) the storage resource of the first partition 232 by deleting designated data stored in the first partition 232 during execution of normal booting. After the storage resource of the first partition 232 is obtained, the electronic device 201 may perform and complete normal booting.

According to various embodiments, upon completion of normal booting, the electronic device 201 may back up data in operation 309. For example, the electronic device 201 may store data stored in the first partition 232 in an external electronic device or an external storage device. The electronic device 201 may automatically store data stored in the first partition 232 in a designated external electronic device or manually store the data stored in the first partition 232 in an external electronic device by the user. For example, data to be backed up may mean directly and/or indirectly generated data. The data to be backed up may include data regarding a picture, music, an image, personal information, etc.

According to various embodiments, the electronic device 201 may back up data and perform an initialization operation. For example, the electronic device 201 may temporarily obtain (or secure) the storage resource of the first partition 232 by performing urgent booting, such that initialization may be recommended to normally operate the electronic device 201. For example, initialization may mean full resetting of the electronic device 201.

According to various embodiments, the electronic device 201 may solve a problem in which the electronic device 201 does not operate normally, by performing initialization. For example, the electronic device 201 may solve a problem (e.g., in which normal booting does not operate normally or at least one program does not operate normally) due to insufficiency of the storage resource.

Figure 4:
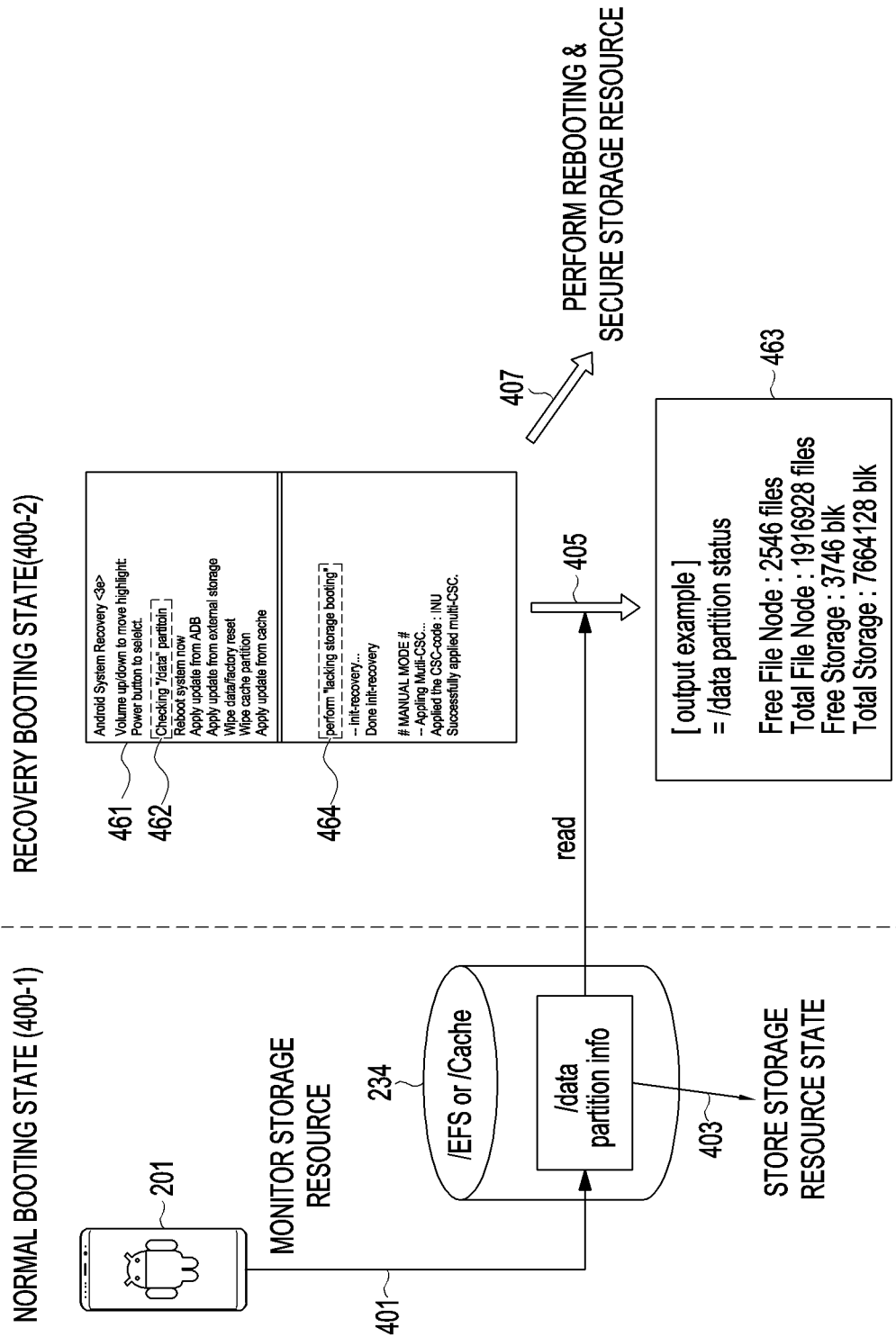
FIG. 4 is a block diagram for describing an operating method of an electronic device according to various embodiments.

FIG. 4 is a block diagram for describing an operating method of the electronic device 201 according to various embodiments.

Referring to FIG. 4, the electronic device 201 (e.g., the electronic device 201 of FIG. 2) may monitor a state of a storage resource of a first partition (e.g., the first partition 232 of FIG. 2) in a state 400-1 where normal booting is completed. For example, the electronic device 201 may monitor a remaining storage space (or block space) and/or the number of remaining file nodes of the first partition in the state 400-1 where normal booting is completed.

According to various embodiments, the electronic device 201 may store resource data indicating the state of the storage resource of the first partition 232 in the second partition 234 (e.g., the second partition 234 of FIG. 2) in operation 403. For example, the resource data may be a "/data partition info" file. The second partition 234 may mean a partition accessible in the state where normal booting is completed, in the state where normal booting is currently performed, and in the state where recovery booting is completed. For example, the second partition 234 may be a "/EFS" partition or a "/Cache" partition.

According to various embodiments, the electronic device 201 may perform recovery booting for recovering the electronic device 201 when normal booting is not normally completed. For example, when the electronic device 201 performs normal booting, but normal booting is not completed normally, recovery booting for recovering the electronic device 201 may be performed. The electronic device 201 may perform recovery booting for recovering the electronic device 201 when the electronic device 201 does not operate normally, in the state 400-1 where normal booting is completed.

According to various embodiments, the electronic device 201 may display the user interface 461 for recovering the electronic device 201 on the display 260 (e.g., the display 260 of FIG. 2) in a state 400-2 where recovery booting is completed.

According to various embodiments, the user interface 461 may include a first object 462 (or a first menu) for identifying the storage resource of the first partition 232 and a second object 464 (or a second menu) for performing urgent booting. For example, upon receipt of an input with respect to the first object 462, the electronic device 201 may identify the state of the storage resource of the first partition 232. Upon receipt of an input with respect to the second object 464, the electronic device 201 may perform urgent booting.

According to various embodiments, upon receipt of a command for identifying the storage resource (e.g., a touch input with respect to the first object 462), the electronic device 201 may display a state 463 of the storage resource of the first partition 232 on the display 260 in operation 405. The electronic device 201 may read resource data from the second partition 234 and display the state 463 of the storage resource of the first partition 232 on the display 260.

According to various embodiments, upon receipt of a command for executing urgent booting (e.g., receipt of the touch input with respect to the second object 464), the electronic device 201 may start normal booting through re-booting in the state where recovery booting is completed. The electronic device 201 may temporarily obtain (or secure) the storage resource of the first partition 232 by deleting designated data stored in the first partition 232 during execution of normal booting, in operation 407.

According to various embodiments, once the storage resource of the first partition 232 is obtained, the electronic device 201 may normally perform normal booting and complete normal booting. Upon completion of normal booting, the electronic device 201 may store the data stored in the first partition 232 in an external electronic device or additionally delete the data stored in the first partition 232, thus solving insufficiency of the storage resource.

Figure 5:
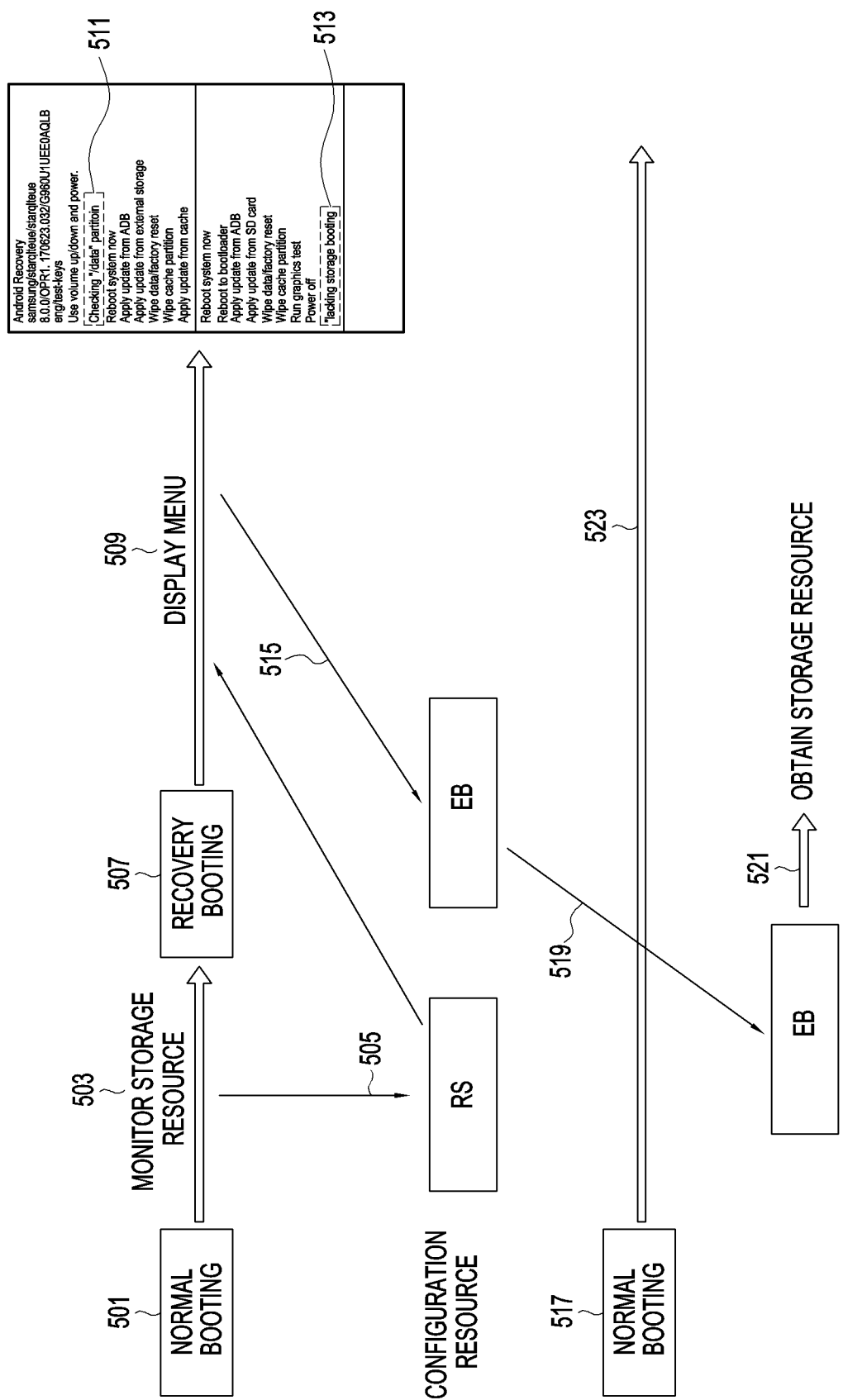
FIG. 5 is a block diagram for describing an operating method of an electronic device according to various embodiments.

FIG. 5 is a block diagram for describing an operating method of the electronic device 201 according to various embodiments.

Referring to FIG. 5, the electronic device 201 (e.g., the electronic device 201 of FIG. 2) may perform normal booting in operation 501.

According to various embodiments, the electronic device 201 may monitor the storage resource of the first partition 232 (e.g., the first partition of FIG. 2) at preset intervals (e.g., at intervals of 1 minute or 30 seconds), upon completion of normal booting. For example, the electronic device 201 may monitor a remaining storage space (e.g., available bytes) and/or the number of remaining file nodes of the first partition 232.

According to various embodiments, the electronic device 201 may store resource data (RS) indicating the monitored storage resource of the first partition 232 in the second partition 234 (e.g., the second partition 234 of FIG. 2) in operation 505. The electronic device 201 may write (or update) the RS indicating the periodically monitored storage resource of the first partition 232 in the second partition 234. For example, the RS may include information about the monitored remaining storage space (e.g., available bytes) and/or number of remaining file nodes of the first partition 232.

According to various embodiments, when normal booting of the electronic device 201 is not performed or the electronic device 201 does not normally operate, the electronic device 201 may perform recovery booting in operation 507.

According to various embodiments, upon completion of recovery booting, the electronic device 201 may display a menu for recovery booting on the display 260 (e.g., the display 260 of FIG. 2) in operation 509. The menu for recovery booting may display a first object for identifying the storage resource in operation 511. The menu for recovery booting may display a second object for obtaining the storage resource by performing normal booting, in operation 513.

According to various embodiments, upon receipt of an input with respect to a first object for identifying the storage resource of the first partition 232, the electronic device 201 may read the RS from the second partition 234. The electronic device 201 may display the state of the storage resource of the first partition 232 on the display 260 based on the read RS. For example, the electronic device 201 may display a remaining storage space (e.g., available bytes) and/or the number of remaining file nodes of the first partition 232 on the display 260.

According to various embodiments, the electronic device 201 may provide the state of the storage resource of the first partition 232 to the user through the display 260. In this way, the user may identify that the booting or operation of the electronic device 201 is not normally performed because of insufficiency of the storage resource.

According to various embodiments, upon receipt of an input with respect to a second object for performing urgent booting, the electronic device 201 may generate EB data capable of identifying urgent booting in operation 515. The electronic device 201 may store the EB data in the second partition 234. The EB data may include trigger information used for the electronic device 201 to perform urgent booting.

According to various embodiments, upon receipt of the input with respect to the second object that performs urgent booting, the electronic device 201 may start normal booting through re-booting in the state where recovery booting is completed, in operation 517.

According to various embodiments, during execution of normal booting, the electronic device 201 may identify the EB data stored in the second partition 264 in the state where normal booting is currently executed.

According to various embodiments, once the EB data is identified, the electronic device 201 may obtain the storage resource by deleting the designated data stored in the first partition 232 in operation 521. When the electronic device 201 enters a state of being accessible to the first partition 232, the electronic device 201 may cause another process to wait for accessing the first partition 232 and delete the designated data stored in the first partition 232. When the electronic device 201 enters the state of being accessible to the first partition 232, the electronic device 201 may delete the designated data stored in the first partition 232 before another process accesses the first partition 232.

According to various embodiments, the electronic device 201 may perform normal booting by temporarily obtaining the storage resource in operation 523. The electronic device 201 may temporarily obtain (or secure) the storage resource by deleting the designated data stored in the first partition 232, and may temporarily avoid the state in which the storage resource is insufficient. In this way, the electronic device 201 may back up the data stored in the first partition 232 of the electronic device 201 by completing booting.

Figure 6:
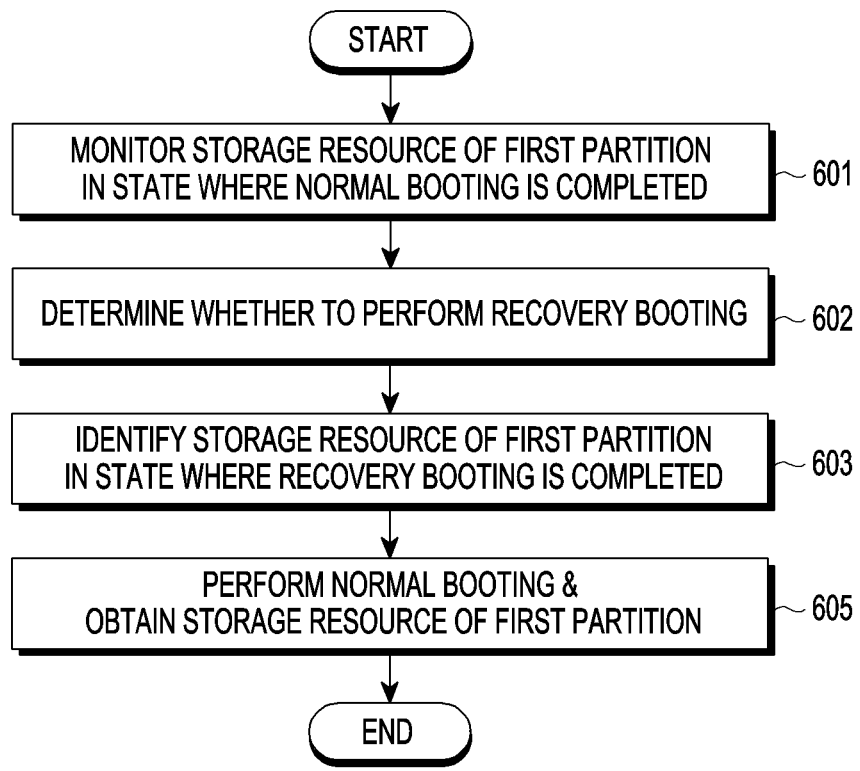
FIG. 6 is a flowchart for describing an operating method of an electronic device, according to various embodiments.

FIG. 6 is a flowchart for describing an operating method of an electronic device, according to various embodiments.

According to various embodiments, operations 601 through 605 may be performed by the electronic device 101 or 201 or the processor 120 or 220.

Referring to FIG. 6, in operation 601, the electronic device 201 according to various embodiments may monitor the storage resource of the first partition 232 (e.g., the first partition 232 of FIG. 2) in the state where normal booting is completed. The first partition 232 may be a user data partition that stores user data.

According to various embodiments, in operation 602, the electronic device 201 may determine whether normal booting has been normally completed. Alternatively, in operation 602, after normal booting is normally completed, the electronic device 201 may determine whether the electronic device 201 operates normally. The electronic device 201 may determine whether to perform recovery booting according to whether the electronic device 201 operates normally, in operation 602. When normal booting is not normally completed or the electronic device 201 does not operate normally in operation 602, the electronic device 201 may perform recovery booting.

According to various embodiments, in operation 603, the electronic device 201 may identify the information about the storage resource of the first partition 232 in the state where recovery booting is completed. The electronic device 201 may determine based on the identified information about the storage resource that the storage resource of the first partition 232 is insufficient. The electronic device 201 may determine that abnormal booting or operation is attributable to insufficiency of the storage resource of the first partition 232.

According to various embodiments, in operation 605, the electronic device 201 may start normal booting and temporarily obtain (or secure) the storage resource of the first partition 232 in the state where normal booting is currently executed. For example, the electronic device 201 may temporarily obtain (or secure) the storage resource of the first partition 232 by deleting designated data stored in the first partition 232 during execution of normal booting. The electronic device 201 may normally perform normal booting by using the temporarily obtained storage resource of the first partition 232.

Figure 7:
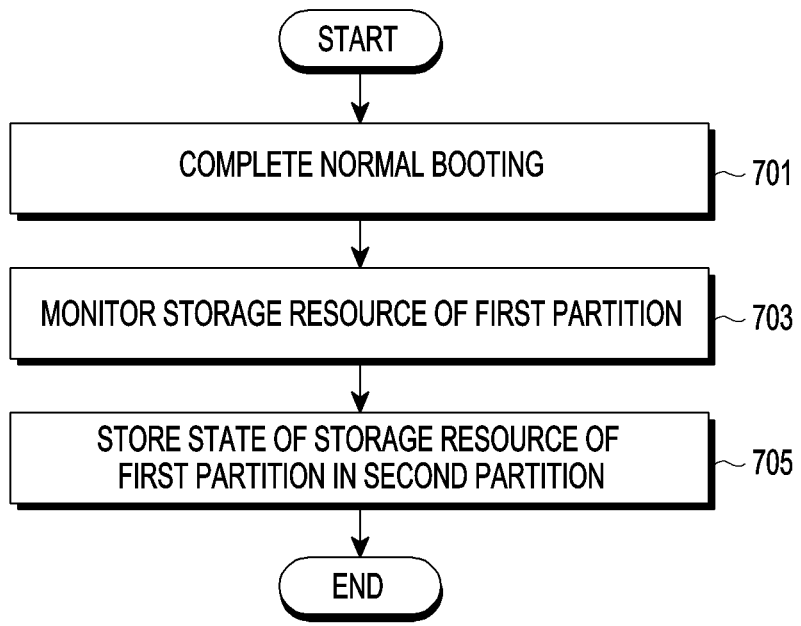
FIG. 7 is a flowchart for describing an operation, performed by an electronic device, of monitoring a storage resource of a first partition, according to various embodiments.

FIG. 7 is a flowchart for describing an operation, performed by an electronic device, of monitoring a storage resource of a first partition, according to various embodiments.

According to various embodiments, operations 701 through 703 may be performed by the electronic device 101 or 201 or the processor 120 or 220.

Referring to FIG. 7, in operation 701, the electronic device 201 according to various embodiments may perform normal booting. For example, the electronic device 201 may normally perform normal booting and complete normal booting. The electronic device 201 may complete normal booting, thus entering to a state where the electronic device 201 is available to the user.

According to various embodiments, in operation 703, the electronic device 201 may monitor the storage resource of the first partition 232 (e.g., the first partition of FIG. 2) at preset intervals (e.g., at intervals of 30 seconds or 1 minute) upon completion of normal booting. For example, the set interval may be automatically set by the processor 220 (e.g., the processor 220 of FIG. 2) or may be manually set by the user.

According to various embodiments, in operation 705, the electronic device 201 may store the monitored state of the storage resource of the first partition 232 in the second partition 234 (e.g., the second partition of FIG. 2). The electronic device 201 may periodically update the monitored state of the storage resource of the memory 232. The second partition 234 may be a partition accessible both in the state where normal booting is completed and in the state where recovery booting is completed. The second partition 234 may be different from the first partition 232.

Figure 8:
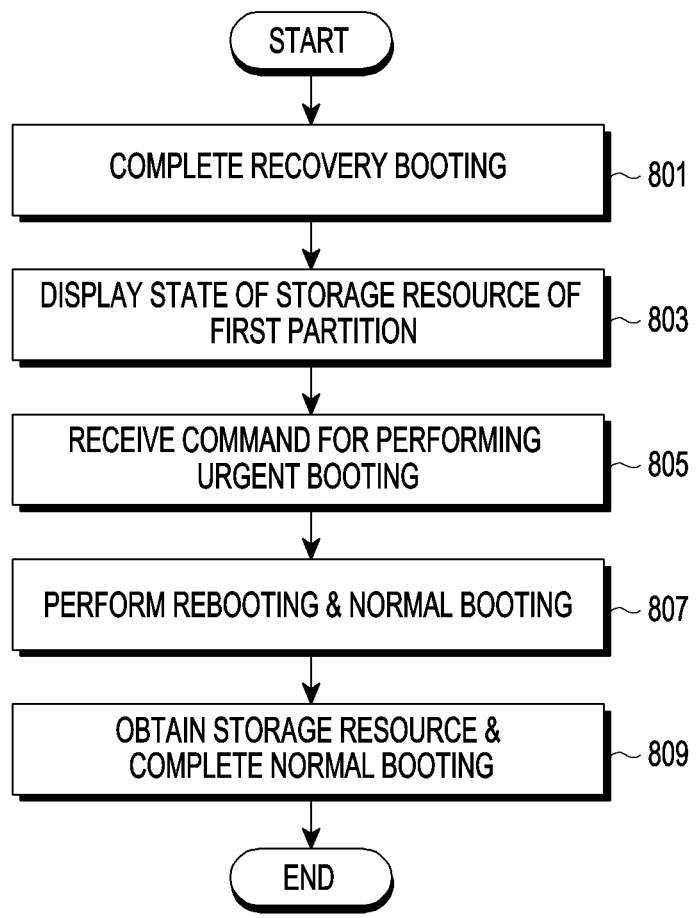
FIG. 8 is a flowchart for describing an operation, performed by an electronic device, of obtaining a storage resource of a first partition and performing normal booting, according to various embodiments.

FIG. 8 is a flowchart for describing an operation, performed by an electronic device, of obtaining a storage resource of a first partition and performing normal booting, according to various embodiments.

According to various embodiments, operations 801 through 809 may be performed by the electronic device 101 or 201 or the processor 120 or 220.

Referring to FIG. 8, in operation 801, the electronic device 201 (e.g., the electronic device of FIG. 2) according to various embodiments may perform recovery booting and complete recovery booting.

According to various embodiments, in operation 803, the electronic device 201 may display the state of the storage resource of the first partition 232 (e.g., the first partition of FIG. 2) through the display 260, upon completion of recovery booting.

According to various embodiments, in operation 805, the electronic device 201 may receive a command for performing urgent booting. The electronic device 201 may start urgent booting in response to the command for performing urgent booting. For example, the electronic device 201 may perform urgent booting in response to a touch input with respect to an object for performing urgent booting displayed on the display 260.

According to various embodiments, in operation 807, the electronic device 201 may perform rebooting in the state where recovery booting is completed. In operation 807, the electronic device 201 may start normal booting through rebooting.

According to various embodiments, in operation 809, the electronic device 201 may temporarily obtain the storage resource of the first partition 232 by deleting the designated data stored in the first partition 232 during execution of normal booting. In operation 807, the electronic device 201 may perform normal booting by using the obtained storage resource. In this way, the electronic device 201 may normally complete normal booting. The electronic device 201 may store the user data stored in the first partition 232 in the external electronic device, upon completion of normal booting.

Meanwhile, operations of the electronic device described with reference to FIGS. 7 and 8 may be temporally continuous or discontinuous. The operations of the electronic device described with reference to FIGS. 7 and 8 may be performed by the same entity or different entities.

Figure 9A:
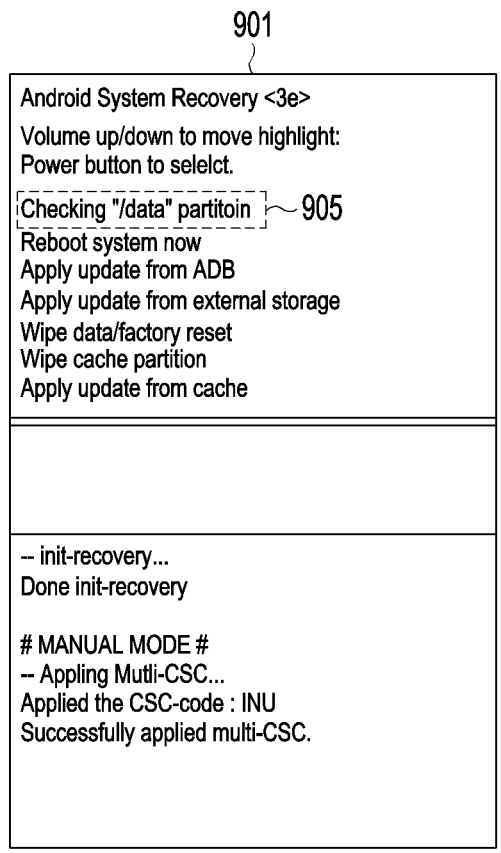
FIGS. 9A and 9B are views illustrating a user interface provided by an electronic device according to various embodiments.
Figure 9B:
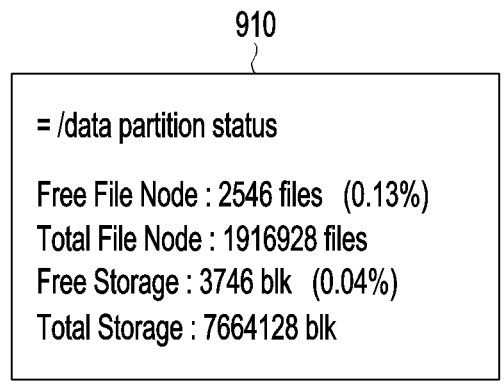

FIGS. 9A and 9B are views illustrating a user interface 901 provided by the electronic device 201 according to various embodiments.

Referring to FIGS. 9A and 9B, the electronic device 201 (e.g., the electronic device of FIG. 2) may display the user interface 901 for recovering the electronic device 201 in the state where recovery booting is completed.

Referring to FIG. 9A, the electronic device 201 may display the user interface 901 upon completion of recovery booting.

According to various embodiments, the user interface 901 may display a first object 905 for identifying the storage resource of the first partition 232 (e.g., the first partition of FIG. 2). For example, the first partition 232 may be a user data partition (e.g., "/data" partition) that stores user data.

According to various embodiments, in response to an input for selecting the first object 905, the electronic device 201 may read a state 910 of the storage resource of the first partition 232 stored in the second partition 234 (e.g., the second partition of FIG. 2).

According to various embodiments, the electronic device 201 may display the state 910 of the storage resource of the first partition 232 through the display 260. In this case, the state 910 of the storage resource of the first partition 232 may be displayed on at least a partial region of the user interface 901.

According to various embodiments, the state 910 of the storage resource of the first partition 232 may include information about the number of file nodes and/or the number of remaining file nodes. In this case, the state 910 of the storage resource of the first partition 232 may include at least one of an absolute value of the number of all file nodes and/or the number of remaining file nodes (e.g., all file nodes: 1916928 files, remaining file nodes: 2546 files) or a percentage value (e.g., remaining file nodes: 0.13%).

According to various embodiments, the state 910 of the storage resource of the first partition 232 may include information about the entire storage space and a remaining storage space. In this case, the state 910 of the storage resource of the first partition 232 may include at least one of an absolute value of the entire storage space and a remaining storage space (e.g., the entire storage space: 7664128 blocks, the remaining storage space: 3746 blocks) or a percentage value (e.g., a remaining storage space: 0.04%).

Figure 10A:
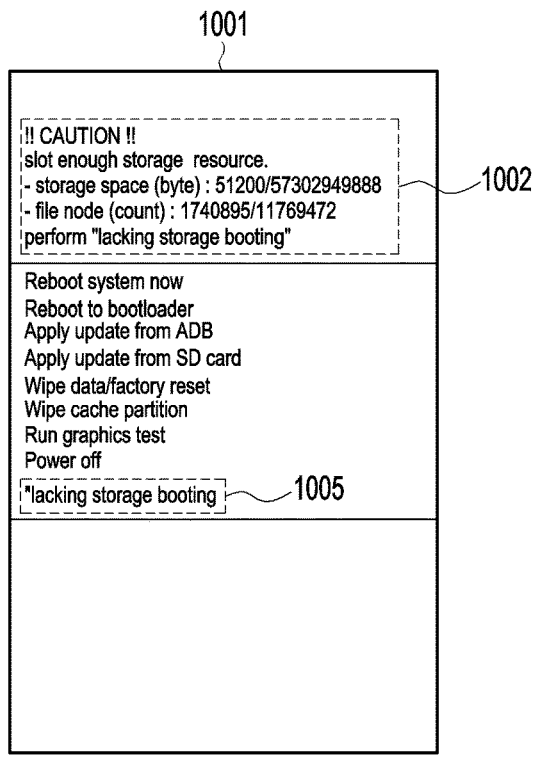
FIGS. 10A, 10B and 10C are views illustrating a user interface provided by an electronic device according to various embodiments.
Figure 10B:
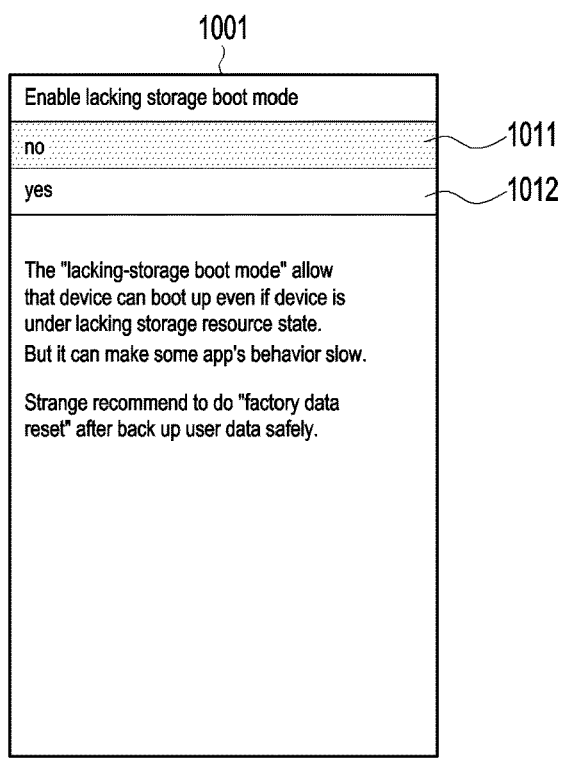

FIGS. 10A and 10B are views illustrating a user interface 1001 provided by the electronic device 201 according to various embodiments.

Referring to FIGS. 10A and 10B, the electronic device 201 (e.g., the electronic device 201 of FIG. 2) may display the user interface 1001 for recovering the electronic device 201 in the state where recovery booting is completed.

Referring to FIG. 10A, the electronic device 201 may display the user interface 1001 upon completion of recovery booting.

According to various embodiments, the user interface 1001 may display a state 1002 of the storage resource of the first partition 232. For example, when a remaining storage resource of the first partition 232 is lower than a preset value, the electronic device 201 may display a state 1002 of the storage resource of the first partition 232 and an alert notification (e.g., a "CAUTION" message) through the user interface 1001. For example, the preset value may correspond to a value of the storage resource with which the electronic device 201 may not operate normally. The electronic device 201 may display an alert notification when the remaining storage space of the first partition 232 is less than 1% of the entire storage space. The electronic device 201 may display an alert notification when the remaining storage space of the first partition 232 is less than 1% of the entire storage space.

According to various embodiments, the user interface 1001 may display a second object 1005 for performing urgent booting. For example, the user interface 1001 may obtain the storage resource of the first partition 232 (e.g., the first partition of FIG. 2) and display a second object 1005 for completing normal booting.

Referring to FIG. 10B, upon receipt of the input for selecting the second object 1005, the user interface 1001 may determine whether to perform urgent booting.

According to various embodiments, in response to the input for selecting the second object 1005, the electronic device 201 may display a screen for determining whether to start urgent booting through the user interface 1001. For example, upon receipt of the input for selecting the second object 1005, the user interface 1001 may display an object 1011 corresponding to "No" not to perform urgent booting and an object 1012 corresponding to "Yes" to perform urgent booting.

Figure 10C:
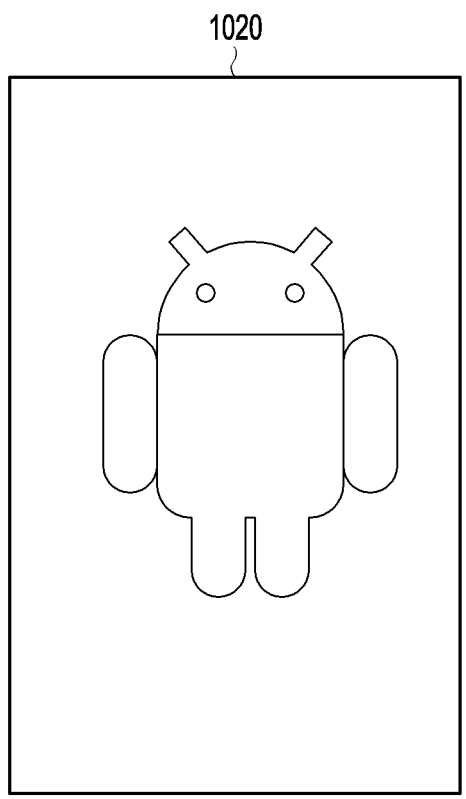

According to various embodiments, when the object 1011 corresponding to "No" is selected, the electronic device 201 may not perform (or start) urgent booting. In this case, the electronic device 201 may display the screen 1020 shown in FIG. 10C.

According to various embodiments, when the object 1011 corresponding to "No" is selected, the electronic device 201 may perform (or start) urgent booting. For example, the electronic device 201 may perform normal booting, and obtain the storage resource of the first partition 232 by deleting designated data stored in the first partition 232 during execution of normal booting.

Figure 11:
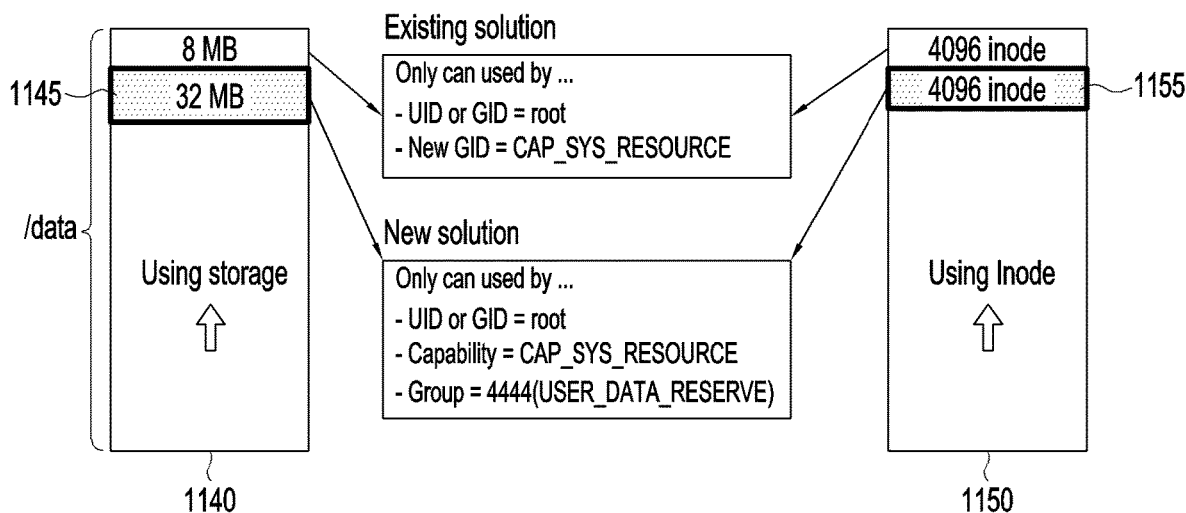
FIG. 11 is a block diagram for describing an operating method of an electronic device according to various embodiments.

FIG. 11 is a block diagram for describing an operating method of an electronic device according to various embodiments.

Referring to FIG. 11, the first partition 232 (e.g., the first partition 232 of FIG. 2) may be a user data partition. When the storage resource of the first partition 232 becomes insufficient, the electronic device 201 (e.g., the electronic device of FIG. 2) may not be capable of executing (or may forcedly terminate) data stored in the first partition 232 or an application capable of deleting an application of low importance, and thus may not be able to delete the data or the application.

According to various embodiments, when insufficiency of the storage resource of the first partition 232 occurs (e.g., a remaining storage resource is less than a set value), the electronic device 201 may select at least one application for executing a designated function (e.g., booting, file arrangement, and/or application management), and allocate a new group ID to selected high-importance applications. The selected application may use a reserved resource (e.g., reserved storage space and file node) by using a group ID.

According to various embodiments, when insufficiency of the storage resource of the first partition 232 occurs, the electronic device 201 may reserve a certain region 1145 of a storage space 1140 of the first partition 232 to execute a selected application. For example, the electronic device 201 may reserve a region of '32 MB' as a region for executing the selected application in the entire storage space 1140. Alternatively, the electronic device 201 may reserve a certain region 1155 of a file node 1150 of the first partition 232 to execute a selected application. For example, the electronic device 201 may reserve a file node "4096" in a total number 1140 of file nodes as a region for executing the selected application.

According to various embodiments, before insufficiency of the storage resource of the first partition 232 occurs, the electronic device 201 may reserve a certain region 1145 of a storage space 1140 of the first partition 232 to execute a selected application. In addition, the electronic device 201 may reserve a certain region 1155 of a file node 1150 of the first partition 232 to execute a selected application.

According to various embodiments, the electronic device 201 may arrange data or an application stored in the first partition 232 even when the storage resource of the first partition 232 is insufficient.

An electronic device according to various embodiments of the present disclosure may include a display, a memory, and a processor operatively connected with the display and the memory, in which the processor is configured to display, on the display, a state of a storage resource of a first partition included in the memory in a state where first booting is completed, in response to a first command for obtaining the storage resource of the first partition, perform second booting, which is different from the first booting, on the electronic device, obtain the storage resource by deleting designated data from data stored in the storage resource of the first partition during the performing of the second booting, and complete the second booting of the electronic device after obtaining the storage resource of the first partition.

The first booting may be recovery booting for recovering the electronic device, and the second booting may be normal booting for setting the electronic device to a state where the electronic device is available.

The processor may be configured to monitor the state of the storage resource of the first partition in a state where normal booting is completed.

The state of the storage resource may include information about a size of a remaining space and a number of available file nodes of the first partition.

The processor may be configured to store the state of the storage resource of the first partition in a second partition that is different from the first partition.

The second partition may be a region that is accessible by the electronic device both in a state where the first booting is completed and in a state where the second booting is completed.

The processor may be configured to display an alert notification through the display when the state of the storage resource satisfies a designated condition related to insufficiency of the storage resource.

The processor may be configured to display a first object for identifying the storage resource on the display in the state where the first booting is completed.

The processor may be configured to display a second object for performing the first booting by obtaining the storage resource on the display, in the state where the first booting is completed.

The processor may be configured to delete the designated data before another process accesses the first partition that enters a state of being available, upon execution of the second booting.

An operating method of an electronic device according to various embodiments of the present disclosure may include displaying a state of a storage resource of a first partition included in a memory of the electronic device, in a state where first booting is completed, in response to a first command for obtaining the storage resource of the first partition, performing second booting, which is different from the first booting, on the electronic device, obtaining the storage resource by deleting designated data from data stored in the storage resource of the first partition, during the performing of the second booting, and completing the second booting of the electronic device after obtaining the storage resource of the first partition.

The first booting may be recovery booting for recovering the electronic device, and the second booting may be normal booting for setting the electronic device to a state where the electronic device is available.

The operating method may further include monitoring the state of the storage resource of the first partition in a state where normal booting is completed.

The state of the storage resource may include information about a size of a remaining space and a number of available file nodes of the first partition.

The operating method may further include storing the state of the storage resource of the first partition in a second partition that is different from the first partition.

The second partition may be a region that is accessible by the electronic device both in a state where the first booting is completed and in a state where the second booting is completed.

The first partition may be a partition using user data.

The operating method may further include displaying a first object for identifying the storage resource in the state where the second booting is completed.

The operating method may further include displaying a second object for performing the first booting by obtaining the storage resource in the state where the first booting is completed.

A computer-readable recording medium according to various embodiments of the present disclosure may store programs for executing operations including displaying a state of a storage resource of a first partition included in a memory of the electronic device, in a state where first booting is completed, in response to a first command for obtaining the storage resource of the first partition, performing second booting, which is different from the first booting, on the electronic device, obtaining the storage resource by deleting designated data from data stored in the storage resource of the first partition, during the performing of the second booting, and completing the second booting of the electronic device after obtaining the storage resource of the first partition.

Each of the foregoing elements of the electronic device may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
   a display;
   a memory;
   a transceiver configured to perform wireless communication with an external electronic device; and
   at least one processor operatively connected with the display, the memory, and the transceiver,
   wherein the at least one processor is configured to:
      perform first booting for recovering the electronic device in response to the electronic device not operating normally;
      display, on the display, information about a storage resource of a first partition included in the memory, in a first state where the first booting is completed;
      in response to a first command for obtaining the storage resource of the first partition, perform second booting for setting the electronic device to be available;
      obtain available space of the storage resource by deleting first designated data from data stored in the first partition, during the performing of the second booting;
      complete the second booting of the electronic device using the available space of the storage resource;
      perform a backup operation to store, in the external electronic device wirelessly coupled with the electronic device, second designated data stored in the first partition, in a second state where the second booting is completed; and
      perform an initialization operation for resetting of the electronic device, in a third state where the backup operation is completed.

2. The electronic device of claim 1, wherein the first designated data includes at least one of cache data, log data, temporary data, and data related to a malignant application, and the second designated data includes data related to a user of the electronic device.

3. The electronic device of claim 1, wherein the at least one processor is further configured to monitor a state of the storage resource of the first partition in the second state.

4. The electronic device of claim 1, wherein the information about the storage resource comprises information about a size of a remaining space in the first partition and a number of available file nodes of the first partition.

5. The electronic device of claim 1, wherein the at least one processor is further configured to store the information about the storage resource of the first partition in a second partition included in the memory.

6. The electronic device of claim 5, wherein the second partition is a region that is accessible by the electronic device both in the first state and in the second state.

7. The electronic device of claim 1, wherein the at least one processor is further configured to display, on the display, an alert notification in response to a state of the storage resource that satisfies a condition related to insufficiency of the storage resource.

8. The electronic device of claim 1, wherein the at least one processor is further configured to display, on the display, a first object for identifying the storage resource in the first state where the first booting is completed.

9. The electronic device of claim 1, wherein the at least one processor is further configured to display, on the display, a second object for performing the second booting by obtaining the storage resource, in the first state.

10. The electronic device of claim 1, wherein the at least one processor is further configured to delete the first designated data before another process accesses the first partition, during the performing of the second booting.

11. An operating method of an electronic device, the operating method comprising:
    detecting the electronic device is not operating normally;
    performing first booting for recovering the electronic device in response to the electronic device not operating normally;
    displaying information about a storage resource of a first partition included in a memory of the electronic device, in a first state after the first booting is completed;
    issuing a first command for obtaining the storage resource of the first partition and performing second booting for setting the electronic device to be available;
    obtaining available space of the storage resource by deleting first designated data from data stored in the first partition, during the performing of the second booting;
    completing the second booting of the electronic device using the available space of the storage resource;
    performing a backup operation to store, in an external electronic device wirelessly coupled with the electronic device, second designated data stored in the first partition, in a second state after the second booting is completed; and
    performing an initialization operation for resetting of the electronic device, in a third state after the backup operation is completed.

12. The operating method of claim 11, wherein the first designated data includes at least one of cache data, log data, temporary data, and data related to a malignant application, and the second designated data includes data related to a user of the electronic device.

13. The operating method of claim 11, further comprising monitoring a state of the storage resource of the first partition in the second state.

14. The operating method of claim 11, wherein the information about the storage resource comprises information about a size of a remaining space in the first partition and a number of available file nodes of the first partition.

15. The operating method of claim 11, further comprising storing the information about the storage resource of the first partition in a second partition included in the memory.

16. The operating method of claim 15, wherein the second partition is a region that is accessible by the electronic device both in the first state and in the second state.

17. The operating method of claim 11, further comprising displaying an alert notification in response to a state of the storage resource that satisfies a condition related to insufficiency of the storage resource.

18. The operating method of claim 11, further comprising displaying a first object for identifying the storage resource in the first state.

19. The operating method of claim 11, further comprising displaying a second object for performing the second booting by obtaining the storage resource, in the first state.

20. The operating method of claim 11, wherein the deleting of the first designated data comprises deleting the first designated data before another process accesses the first partition, during the performing of the second booting.

* * * * *